(No Model.)
C. RAUSCH.
BILLIARD CUE TIP.
No. 432,330. Patented July 15, 1890.
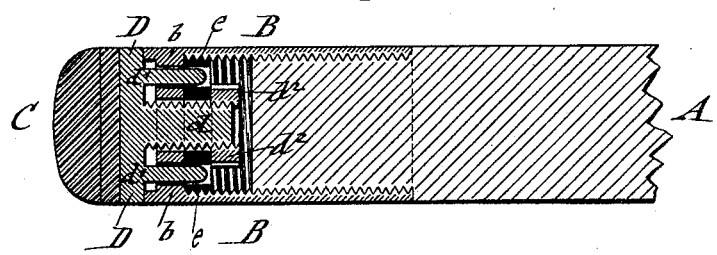
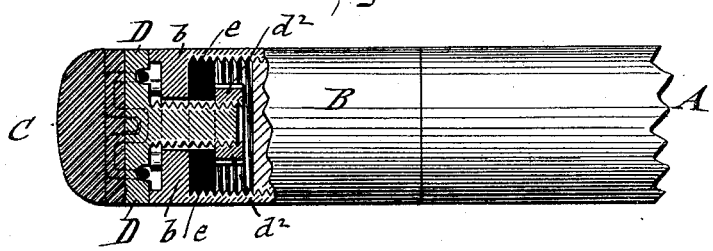
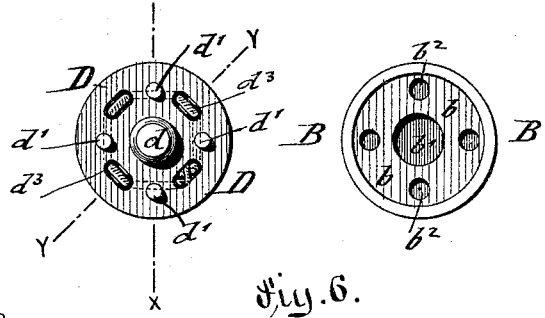
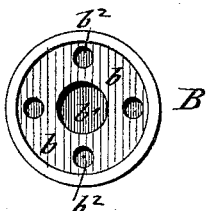
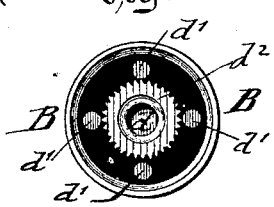
WITNESSES:
INVENTOR:
Charles Rausch
BY
ATTORNEYS

UNITED STATES PATENT OFFICE.

CHARLES RAUSCH, OF NEW YORK, N. Y.

BILLIARD-CUE TIP.

SPECIFICATION forming part of Letters Patent No. 432,330, dated July 15, 1890.

Application filed April 10, 1890. Serial No. 347,346. (No model.)

*To all whom it may concern:*

Be it known that I, CHARLES RAUSCH, a citizen of the United States, residing in the city, county, and State of New York, have invented certain new and useful Improvements in Billiard-Cue Tips, of which the following is a specification.

This invention has reference to improved means of attaching tips to billiard-cues in such a manner that the tips are prevented from getting detached from the cues and that worn-out tips can be readily exchanged for new tips; and the invention consists of a billiard-cue tip which is attached to a disk-shaped head having guide-pins and a screw-threaded shank that are passed through holes of the web of an interiorly-threaded ferrule which is applied to the end of the cue. The ferrule is provided with a washer at the inside of the perforated web, which washer serves for deadening the metallic ring of the ferrule and for supporting the screw-nut by which the tip-carrying head is applied to the ferrule.

In the accompanying drawings, Figure 1 represents a side view of a billiard-cue with my improved tip. Fig. 2 is a vertical longitudinal section of a billiard-cue with my improved tip attachment drawn on a larger scale and taken on line $x\,x$, Fig. 4. Fig. 3 is also a vertical longitudinal section of the tip taken on the line $y\,y$, Fig. 4; and Figs. 4, 5, and 6 are detail end views, respectively, of the detachable tip-carrying head, the ferrule with the washer removed, and the ferrule in connection with the washer and tip-carrying head secured thereto.

Similar letters of reference indicate corresponding parts.

Referring to the drawings, A represents a billiard-cue, to the threaded end of which is applied a metallic ferrule B, that is provided with an interior screw-thread for being screwed onto the threaded end of the cue. The ferrule B is provided with a web $b$, having a central opening $b'$ for the passage of the threaded shank $d$ of a tip-carrying head D, and with smaller holes $b^2$ for the passage of the steadying-pins $d'$ of the head D. To the inside of the web $b$ is applied a washer $e$, of leather or other suitable sound-deadening material, which washer is perforated in the same manner as the web $b$ for the passage of the shank $d$ and guide-pins $d'$ of the head C'. The washer $e$ serves for neutralizing the metallic ring that is imparted to the ferrule in playing and for preventing the transmission of the vibrations from the tip-carrying head D to the ferrule B. The tip-carrying head D is securely attached to the web of the ferrule by a screw-nut $d^2$, which is screwed up on the shank $d$ of said head by a suitable key until stopped by the washer $e$. The screw-nut $d^2$ is retained in position on the shank $d$ by the elasticity of the washer $e$, so that it cannot get detached therefrom during the playing with the cue by the vibrations imparted to the tip and ferrule by the concussions with the balls. The tip C is made of leather or other suitable material and stitched to the head D by twine, said twine being passed through holes $d^3$ of the head, which holes are arranged intermediately between the guide-pins $d'$ of the same, as shown clearly in Figs. 3 and 4.

As the tip C is not glued to the head D of the ferrule in attaching the tips to billiard-cues, but is positively tacked thereto by twine, it cannot get detached from the head during the use of the cue. When the tip is worn out, a new tip is attached to the head after the worn-out tip has been removed.

A very durable tip for billiard-cues is thus obtained, which by its metallic, silver, or nickel-plated ferrule imparts a very ornamental appearance to the cue.

By the use of my improved tip and ferrule the cue does not require to be shortened when attaching a new tip; but it retains all its original length, while the slightly-increased weight at the end of the cue caused by the ferrule permits a steadier motion of the cue in making shots.

Having thus described my invention, I claim as new and desire to secure by Letters Patent—

1. The combination, with a billiard-cue, of an interiorly-threaded ferrule having a perforated web, a detachable head having a screw-threaded shank, and guide-pins passing through holes of said web, said head being attached to the ferrule and a tip attached to said head, substantially as set forth.

2. The combination, with a billiard-cue, of an interiorly-threaded ferrule having a perforated web, a disk-shaped head having a screw-threaded shank, and guide-pins passing through holes in said web, a perforated washer of sound-deadening material applied to said web, a screw-nut applied to the threaded shank of the head, and a tip attached to the face of the head, substantially as set forth.

3. The combination, with a ferrule having a perforated web, of a tip-carrying head having a screw-threaded shank and guide-pins, a leather or other tip attached to said head, a perforated washer applied to said web, and a screw-nut for attaching the tip-carrying head to the web of the ferrule, substantially as set forth.

In testimony that I claim the foregoing as my invention I have signed my name in presence of two subscribing witnesses.

CHAS. RAUSCH.

Witnesses:
PAUL GOEPEL,
MARTIN PETRY.